United States Patent
Mankovskii et al.

(10) Patent No.: US 10,222,959 B2
(45) Date of Patent: Mar. 5, 2019

(54) VISUAL MODIFICATION AND TRAINING OF AN ANOMALY DETECTION IMAGE

(71) Applicants: Serguei Mankovskii, Morgan Hill, CA (US); Ian Davis, Waterloo (CA); Michael Godfrey, Waterloo (CA)

(72) Inventors: Serguei Mankovskii, Morgan Hill, CA (US); Ian Davis, Waterloo (CA); Michael Godfrey, Waterloo (CA)

(73) Assignee: CA, Inc., New York, NY (US)

( * ) Notice: Subject to any disclaimer, the term of this patent is extended or adjusted under 35 U.S.C. 154(b) by 309 days.

(21) Appl. No.: 15/087,338

(22) Filed: Mar. 31, 2016

(65) Prior Publication Data

US 2017/0285917 A1    Oct. 5, 2017

(51) Int. Cl.
*G06F 3/0484* (2013.01)
*G06T 11/20* (2006.01)

(52) U.S. Cl.
CPC ...... *G06F 3/04845* (2013.01); *G06F 3/04842* (2013.01); *G06T 11/206* (2013.01)

(58) Field of Classification Search
CPC . G06F 3/04845; G06F 3/04842; G06T 11/206
USPC ........................................ 345/440
See application file for complete search history.

(56) References Cited

U.S. PATENT DOCUMENTS

| | | | | |
|---|---|---|---|---|
| 6,792,162 B1* | 9/2004 | Edgar | ............... | G06T 5/10 382/275 |
| 9,235,912 B2* | 1/2016 | Okano | ............... | G06F 15/0225 |
| 2010/0223276 A1* | 9/2010 | Al-Shameri | ...... | G06F 17/30333 707/769 |
| 2011/0162848 A1* | 7/2011 | Duffy | ............... | E21B 43/16 166/305.1 |
| 2012/0278477 A1* | 11/2012 | Terrell | ............ | H04L 41/5009 709/224 |
| 2014/0314301 A1* | 10/2014 | Azar | ............... | G06K 9/0014 382/133 |

* cited by examiner

*Primary Examiner* — Kimberly A Williams
(74) *Attorney, Agent, or Firm* — Baker Botts L.L.P.

(57) ABSTRACT

A method includes formatting for display, on a visual screen, an image comprising: (1) a coordinate system, (2) a plurality of distinguishable areas within the coordinate system, each distinguishable area graphically representing a respective formula, and (3) a plurality of data points. The method also includes receiving user input comprising a modification to a particular distinguishable area. In response to receiving the user input, the method includes modifying one or more respective formulas based on the modification to the distinguishable area. For each data point, the method further includes associating the data point with one of the distinguishable areas by determining which of the modified formulas the data point falls within. The method further includes formatting for display a graphical representation of each modified formula. The method additionally includes storing the graphical representation of each modified formula for use as a modified image in future operations.

20 Claims, 7 Drawing Sheets

VISUAL MODIFICATION AND TRAINING OF AN ANOMALY DETECTION IMAGE

BACKGROUND

The present disclosure relates generally to Application Performance Management (APM) and data mining, and more specifically, to visual modification and training of an anomaly detection image.

BRIEF SUMMARY

According to an aspect of the present disclosure, a method may include displaying on a visual screen an image of a coordinate system, several data points within the coordinate system, and several distinguishable areas within the coordinate system. Each distinguishable area may be a graphical representation of a respective formula. The method may also additionally include receiving a user input modifying a particular distinguishable area. In response, the method may include modifying one or more of the respective formulas based on the modification to the distinguishable area. In addition, the method may include associating each of the several data points with one of the distinguishable areas by determining which of the respective ranges each data point falls within. The method also may include displaying a graphical representation of each modified formula and storing the graphical representation of each modified formula for use as a modified image in future operations or iterations of the method.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

As the use of software applications has increased, so has the use of APM to monitor the performance and availability of those applications. Generally speaking, APM monitors both the performance and availability of a software application as it is stressed. APM is performed with the goal of learning about the application to maintain a set level of service for an application. APM products are useful for detecting the performance limits of an application as well as detecting and diagnosing complex application performance issues. To make the most use of APM, it is critical to have an accurate method of detecting a problem in the APM data, i.e., detecting an outlier or an anomaly.

Anomaly detection is the art of identifying non-conforming or unexpected data in a dataset. Three known categories of anomaly detection are: (1) unsupervised, (2) supervised, and (3) semi-supervised. Known techniques of unsupervised anomaly detection detect anomalies by identifying data that does not conform to the remainder of the dataset under the assumption that most of the data is normal. On the other hand, known techniques of supervised anomaly detection compare data to a known normal or abnormal dataset using a trained statistical classifier to classify a data as normal or anomalous. In the middle is semi-supervised anomaly detection, where known techniques detect anomalies by constructing a normal model from a normal training dataset and testing the data using probabilities.

While certain example systems and methods disclosed herein may be described with reference to Application Performance Management (APM), data mining, or anomaly detection, systems and methods disclosed herein may be related to any field. Moreover, certain examples disclosed herein may be described with respect to performance data, transaction rate data, response time data, or any other field that may involve anomaly detection. Certain embodiments in the present disclosure are merely provided as example implementations of the processes described herein.

Several techniques for detecting anomalies in datasets exist. A few non-exhaustive examples of the known anomaly detection techniques include local outlier factor, DBSCAN, OPTICS, subspace and correlation-based outlier detection, various cluster analysis techniques, k-nearest neighbor, Support Vector Machine, and various other statistical, time series, rule-based, or machine learning algorithms. However, all of these techniques are only useful in detecting anomalies if they are consistent with a human judgment of whether an event constitutes an anomaly. Accordingly, application of numerical techniques is not the most accurate technique for detecting anomalies unless the numerical technique somehow captures the heuristics of human judgment. Existing systems, those traditionally based on numerical techniques, require tedium and complexity to introduce human judgment into the numerical analysis in the univariate case, let alone the multivariate case.

Systems and methods disclosed herein may introduce human judgment into the traditional anomaly detection techniques using two-dimensional and three-dimensional plots by visually generating an anomaly detection image and modifying/training that anomaly detection model through iterative manipulation and modification of the anomaly detection image.

Figure 4:
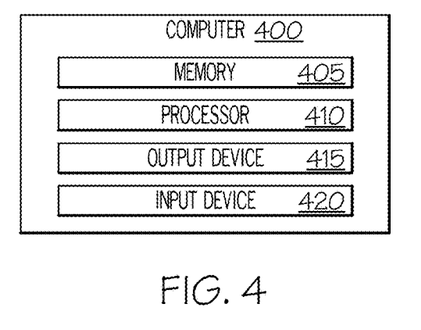
FIG. 4 is a schematic representation of a system configured to implement the processes of visually generating and implementing an anomaly detection image, modifying/tuning an anomaly detection image, or other processes.

The systems and methods disclosed herein may interact with a user or users through, for example, a computer 400 terminal such as a laptop, notebook, desktop, smartphone, or tablet, or similar computing device. In such an embodiment, information may be presented to a user on a visual screen. A visual screen may be a monitor, television, display, or similar electronic device using, for example, LCD, LED, CRT, PDP, Laser, OLED, AMOLED, Retina, or other similar technology.

Figure 1:
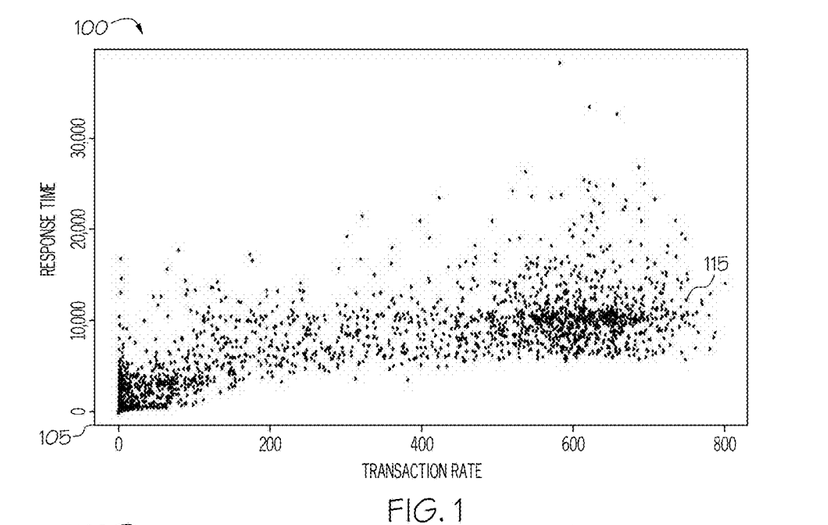
FIG. 1 illustrates an example visualization of a coordinate system and plurality of data points within the coordinate system.
Figure 2:
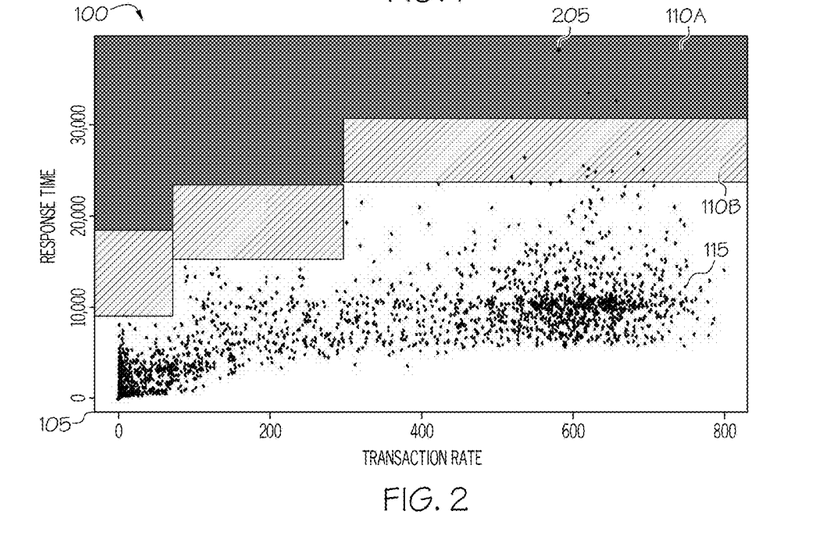
FIG. 2 illustrates the example visualization of FIG. 1 including a plurality of distinguishable areas.

Referring now to FIG. 1 and FIG. 2, on the visual screen, the system and method herein described may format for display an image 100. In particular embodiments, the image 100 may be an anomaly detection image. An anomaly detection image may, in particular embodiments, be used in APM to detect an anomalous data in a dataset. For example, the anomaly detection image may be illustrated as a contour map, time series plot, or some other chart or plot. In one particular embodiment of the systems and methods disclosed herein, the image 100 may be of a coordinate system 105, a plurality of distinguishable areas, a plurality of data points 115, and any combination thereof. For example, in one specific embodiment, the image 100 may be comprised of a coordinate system 105, a plurality of distinguishable areas within the coordinate system 105, and a plurality of data points 115, as illustrated in FIG. 2. In another embodiment, the image 100 may be comprised of a coordinate system 105 and a plurality of data points 115, as illustrated in FIG. 1.

In addition to the examples provided above, particular embodiments may feature other images on the visual screen in addition to the images discussed with respect to the systems and methods described herein. Therefore, the image 100 may not be the only graphic displayed on the visual screen. Moreover, in one embodiment of the systems and methods disclosed herein, the image 100 may be a modified image that was stored during a previous operation. The modified image may be a modified/trained anomaly detection image. As will be discussed below, the systems and methods described herein may be performed iteratively, wherein the output of one operation is the input to the next, thereby providing iterative generation or modification/training of the image 100. In addition, the image 100 may be displayed in two or three dimensions.

Continuing with the particular embodiment described above, the image 100 may comprise a coordinate system 105. Coordinate system 105 may be used for representing data. Such a coordinate system 105 may be, for example, comprised of one or more axes forming a chart, graph, or number line. Moreover, in particular embodiments the coordinate system 105 may be two-dimensional, meaning that it may be comprised of two axes, for example an X-axis and a Y-axis. In an alternative embodiment, the coordinate system 105 may be three-dimensional, meaning that it may be comprised of three axes, for example, X, Y, and Z axes. The coordinate system 105 may be scalable, meaning that it can graphically represent data on a micro or a macro scale.

Referring to FIG. 1 and FIG. 2, one particular coordinate system 105 may feature, for example, a response time variable, i.e. a performance variable, plotted on the Y axis, and a transaction rate variable, i.e., a load variable, plotted on the X axis. In this particular example, the plurality of data points 115 represent the response time of an application as the transaction rate (load) is increased. Therefore, in this particular example the coordinate system 105 may be one that would be used in APM, whereby a user of the systems and methods disclosed herein could monitor the performance of an application by analyzing how the application's response time is affected as the transaction rate is increased.

Referring now to FIG. 2, and still continuing with the particular embodiment described above, the image 100 may comprise a plurality of distinguishable areas within the coordinate system 105. A distinguishable area in such an embodiment may be, for example, an area of the coordinate system 105 that is visually different from another area of the coordinate system 105. Such visual differences may be, for example, represented by different colors, shades, textures, or any other appreciable difference in appearance. In some embodiments of the methods and systems disclosed herein, there may be more than one distinguishable area within the coordinate system 105, for example, distinguishable areas 110A-110C in FIG. 5. In such an embodiment, every distinguishable area may be distinguishable from the other distinguishable areas, as well as distinguishable from the data points. In certain embodiments, distinguishable areas may be defined and modified, meaning that a distinguishable area may be dynamic.

In certain embodiments, a distinguishable area may be associated with an action. Such an action may include one or more response actions, as are discussed below. A particular embodiment may feature a distinguishable area with the associated action of generating an alert or notification. A second distinguishable area in that example may have the associated action of waiting and seeing if particular other events occur before generating an alert or notification. Continuing with that same example, a third distinguishable area may have the associated action of suppressing an alarm or notification that might otherwise be generated.

Also with respect to distinguishable areas, in particular embodiments a distinguishable area may graphically represent a respective formula. In such an embodiment, the distinguishable area may be the visual representation of the formula on the coordinate system 105 described above. As will be described in greater detail below, the formula may be a dataset, and thus it may be graphically represented by displaying the data comprising the formula within the coordinate system 105 according to the respective axes of the coordinate system 105.

In one embodiment where an action is associated with a distinguishable area, the methods and systems disclosed herein may cause the action to be initiated upon a certain event. Such events may include, among others, the presence of a data point within the distinguishable area, or the absence of a data point within a respective area. Upon determining either presence of absence, a particular implementation of the systems and methods disclosed herein may initiate the action associated with that distinguishable area.

In one particular embodiment, there may be, for example, a distinguishable area that is colored red, a distinguishable area that is colored yellow, and a distinguishable area that is colored white. However, the systems and method described herein contemplate any number of distinguishable areas; in other words, there may be one, two, twenty, or more distinguishable areas within the coordinate system 105. Each distinguishable area may be separated from or adjacent to another distinguishable area. Moreover, a distinguishable area may refer to the entire area within the coordinate system 105 with a certain appearance.

Figure 5:
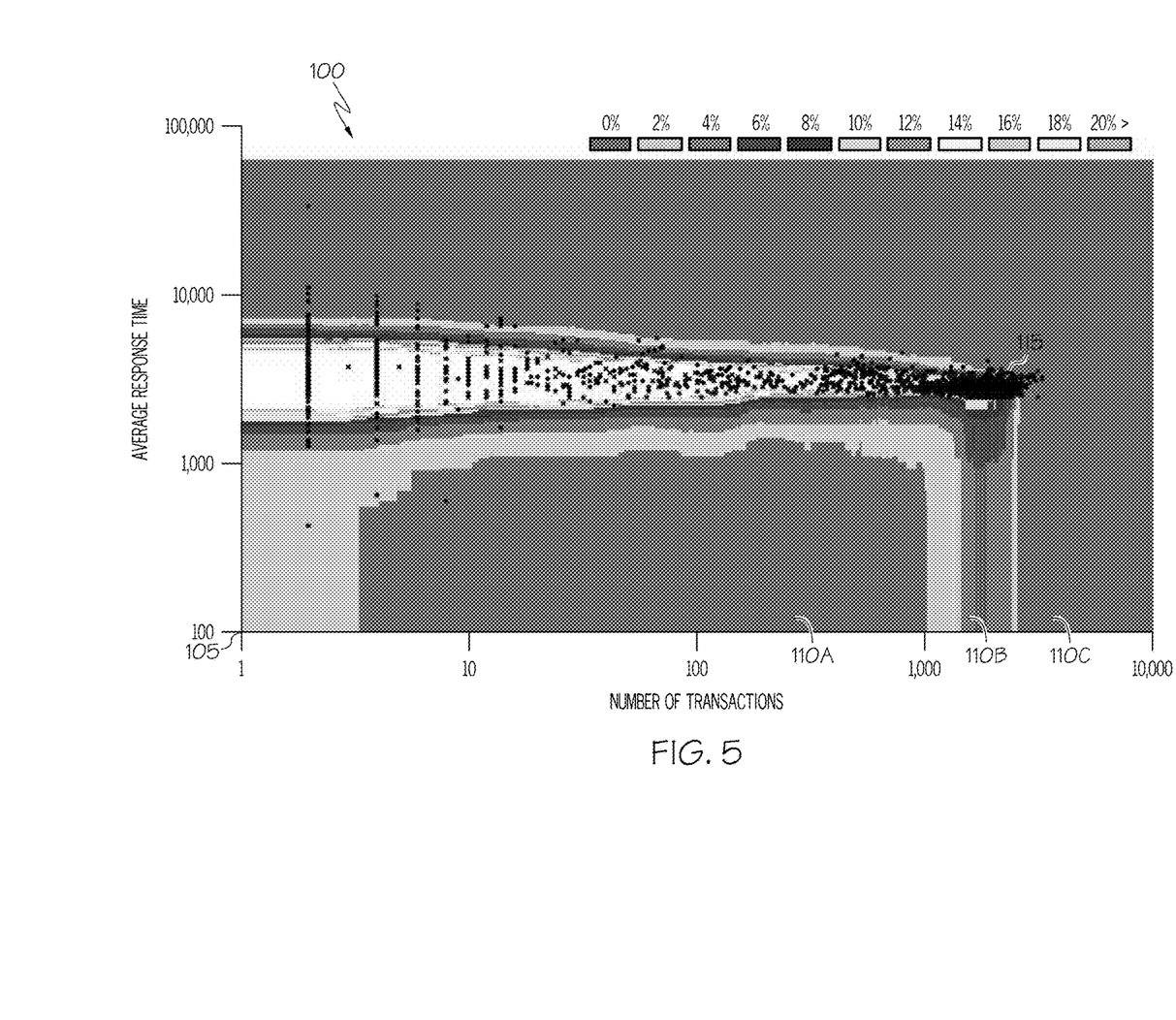
FIG. 5 illustrates an example visualization of a modified/trained anomaly detection image.

Referring now to FIG. 2, distinguishable area 110A may be a rectangular geometric shape. But as is illustrated in FIG. 5, distinguishable area 110C may not be geometric, that is, it may be random, or free forming, as is illustrated in a contour map. Within the scope of the methods and systems disclosed herein, in certain embodiments, the distinguishable area may be ovicular, circular, triangular, square, or any other geometric shape.

In some embodiments or examples of the methods and systems disclosed herein, a particular one distinguishable area may be referred to. A particular distinguishable area may be, for example, the distinguishable area that is white, thereby referring to all areas within the coordinate system 105 that are colored white. In another example, a particular distinguishable area may be the distinguishable area that is red, blue, orange, pink, gray, or any other distinguishable shade of gray or color. Therefore, in such an embodiment, a particular distinguishable area may be referring to one single distinguishable area.

Referring now to FIG. 5, in certain embodiments of the methods and systems disclosed herein, each distinguishable area may correspond to a respective tolerance category, as is illustrated in the key to the coordinate system 105 depicted in FIG. 5. Thus, in certain embodiments, for every distinguishable area that is displayed within the coordinate system 105, there may be a corresponding tolerance category. A tolerance category may, for example, represent the expected frequency of observing a data point. Therefore, in certain embodiments, each distinguishable area may be representative of the frequency with which a data point is expected to fall within that distinguishable area. In addition, in such an embodiment, there may be three or more tolerance categories, including but not limited to an anomalous category, an acceptable category, and a normal category. Each of the anomalous, acceptable, and normal categories in this example would be graphically represented by a distinguishable area within the coordinate system 105, and would represent the frequency with which a data point is expected to fall within that distinguishable area.

In certain embodiments of the methods and systems disclosed herein, a tolerance category may be associated with a respective response action. A respective response action may include one or more of the actions associated with a distinguishable area, as described above. Further, a respective response action may include, for example, utilizing a processor 410 to instruct an output device 415 to generate a notification. Such a notification may for example be presented to a user in the form of a graphical window displayed on the visual screen. Other notifications may include utilizing the processor 410 and the output device 415 to color the data point or highlight it in such a way that it is distinguishable from the other data points, or to generate an audible notification utilizing output device 415. In yet another example, the notification may be a notification message or transmission to another computer 400 or similar electronic device, or some other system through a network such as the Internet.

By way of example, in a particular embodiment the image 100 may be comprised of the coordinate system 105, the plurality of data points 115, and three distinguishable areas: a distinguishable area that is red, a distinguishable area that is pink, and a distinguishable area that is white, or some other descending shade of gray if the distinguishable areas are displayed in gray scale, as illustrated in FIG. 2 and FIG. 5. Continuing with the example, the distinguishable area that is red may correspond to the anomalous category, which may have, for example, an expected frequency of two percent or less. The distinguishable area that is pink may correspond to the acceptable category, which may have, for example, an expected frequency of more than two percent but less than four percent. The distinguishable area that is white may correspond to the normal category, which may have an expected frequency of ninety six percent, in other words, most cases. As stated above, there may be any number of distinguishable areas, and thereby any number of respective tolerance categories, and thus an administrator of the systems and methods disclosed herein may be able to define as many tolerance categories and distinguishable areas as he or she desires to attain the level of precision needed by the APM product and the type of data being monitored.

Therefore, in the example above, if a new data point fell within the area of the coordinate system 105 comprising the distinguishable area that is red, then that data point may be treated as being anomalous, i.e. should not appear with a frequency of more than two percent of observed data points, because the distinguishable area that is red corresponds to the anomalous category. Likewise, if a new data point fell within the area of the coordinate system 105 comprising the distinguishable area that is pink, then that data point may be treated as acceptable, i.e., should not appear with a frequency of more than two percent but less than four percent of the time, because the distinguishable area that is pink corresponds to the acceptable category. Finally, if a new data point fell within the area of the coordinate system 105 comprising the distinguishable area that is white, then that data point may be treated as normal, i.e., should appear most of the time, for example, in ninety six percent of cases. As will be described in more detail below, different actions may be taken according to the different tolerance categories and corresponding different distinguishable areas.

In some embodiments, another aspect of the distinguishable areas is that each distinguishable area graphically represents a respective formula. In other words, in certain embodiments each area within the coordinate system 105 associated with a particular distinguishable area may be not only represented graphically, as is displayed within the coordinate system 105, but also in the form of a formula. Such formulas may, for example, be a mathematical relationship expressed in symbols, rules, or as is typical, words or computer code that may take the form of conditional statements such as "if-then" or "if-then-else" statements. For example, in certain embodiments, a formula may comprise a range of axis values, or the union of multiple ranges of axis values, corresponding to the area or range of the coordinate system 105 associated with a corresponding distinguishable area. In some embodiments, the range of axis values corresponding to a particular distinguishable area may be disjointed from another range of axis values corresponding to a different distinguishable area. That is to say that the ranges of axis values corresponding to two distinct distinguishable areas share no common axis values, i.e., they are distinct. In each of these examples, however, the formula in one way or another is relational to the coordinate system 105, meaning that it is translatable into a range of the coordinate system 105 that can be directly compared to the data points or an ordered pair that represents a data point.

Referring now to FIG. 2, consider an image 100 that may be comprised of a coordinate system 105, a plurality of distinguishable areas, and a plurality of data points 115. On the X-axis may be a transaction rate variable, and on the Y-axis may be the response time variable, for example. Moreover, there may be a plurality of distinguishable areas. As illustrated in the example provided in FIG. 2, there are three distinguishable areas. In the top portion of the coordinate system 105, the distinguishable area 110A may represent, for example, the anomalous category. The respective formula, which is graphically represented as the distinguishable area 110A, may be a set of rules, for example: (a) if transaction rate is above 300, a response time above 30000 milliseconds is anomalous; (b) if transaction rate is between 100 and 300, a response time above 25000 is anomalous; and (c) if transaction rate is below 100, a response time above 20000 is anomalous. Similarly, the middle portion of the coordinate system 105 illustrates the distinguishable area 110B, which may represent, for example, the acceptable category. The respective formula, which is graphically represented as the distinguishable area 110B, may be a set of rules, for example: (a) if transaction rate is above 300, a response time between 25000 and 30000 milliseconds is acceptable; (b) if transaction rate is between 100 and 300, a response time between 15000 and 25000 is acceptable; and (c) if transaction rate is below 100, a response time between 10000 and 20000 is acceptable. As the example shows, in certain embodiments, the formula may be comprised of a set of rules containing a range or ranges of axis values, which are graphically represented by the respective distinguishable areas.

As will be readily appreciated by one skilled in the art, distinguishable areas that are rectangular in shape, as in FIG. 2 and the example above, are easily expressed as rules and sets of axis values. However, distinguishable areas may not be rectangular, but rather, may take many other geometric forms, or in the most complex case, may be of random, free form, as is illustrated in FIG. 5 with distinguishable areas 110A-110C. In the random case, defining or generating a formula representing the distinguishable area becomes increasingly complex, even more so in the three-dimensional scenario.

Referring now to FIG. 1, certain implementations of the systems and methods disclosed herein may comprise a plurality of data points 115 within the coordinate system 105. Such data points may, for example, define historical performance data for a computer system, as may be the case in the field of APM. For example, the plurality of data points 115 illustrated in FIG. 1 may be, for some time in the past, performance data for a particular application wherein the APM program was monitoring how the response time of an application was affected as the transaction rate, or load, was increased. The data points which are displayed within the coordinate system 105 may be multivariate. Accordingly, certain embodiments of the methods and systems disclosed herein may be expanded to an arbitrary size multivariate case and generating formulae by capturing all pairwise relationships until the entire multivariate space is covered.

As was mentioned with respect to a particular example above, certain embodiments may feature a first variable and a second variable within the plurality of data points 115. For example, in the field of APM it is often useful to monitor how a particular application handles increased traffic or load. In such a case, the first variable may be, for example, a time variable. In such a case the first variable may be a rate variable such as a transaction rate variable, expressing a number of transactions per unit of time. The second variable may be, for example, a performance variable. In such a case the second variable may be a response time variable, which expresses the amount of time that it took for the program to handle a particular request, load, or whatever may have been the nature of the being observed. In other words, the second variable may measure how the application performed.

Certain methods and systems disclosed herein may disclose a computer 400 receiving a user input. The input may be received by the computer 400 at the input device 420, where it is then passed to the processor 410 and memory 405 to be received, interpreted, and executed as an instruction to the processor 410. In some embodiments, the methods and systems disclosed herein may also receive a second user input. User input may come in many forms through the use of peripheral devices connected to a computer 400 through an output device 415. For example, in the typical case, a user may use a peripheral device such as a mouse. However, other peripherals may be used such as a touchscreen, stylus, keyboard, image scanner, or microphone. Through these various devices for delivering user input to the computer 400, user input may comprise any of clicking, dragging, touching, importing, speaking, writing, or the like. In certain embodiments of the methods and systems disclosed herein, user input may also include instructions to the processor 410 to cause certain actions to be initiated and performed.

Figure 7:
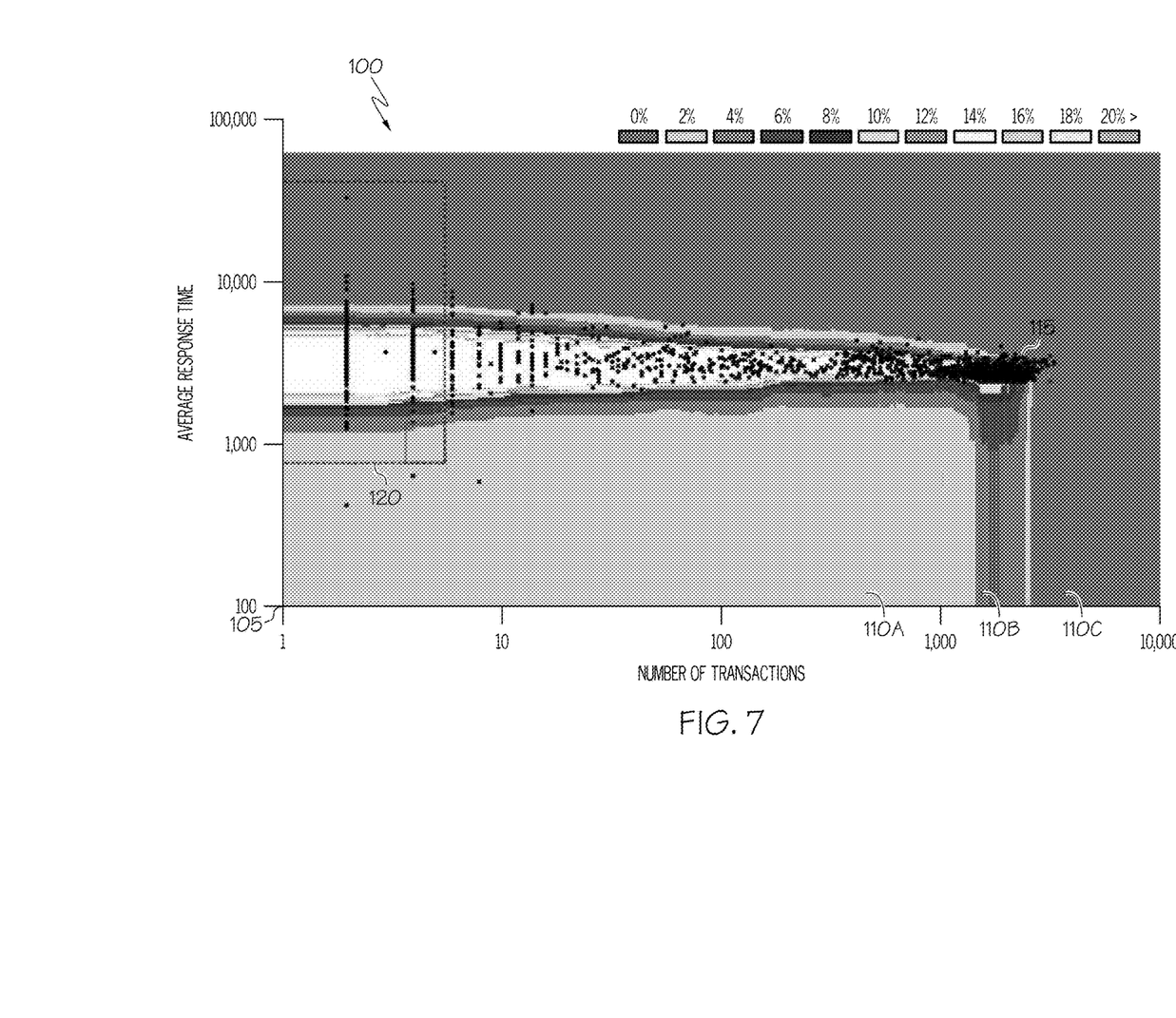
FIG. 7 illustrates the example visualization of FIG. 5 including a user modification to a plurality of distinguishable areas of the anomaly detection image.

Referring now to FIG. 7, in one embodiment of the systems and methods disclosed herein, a user input may comprise the input device 420 receiving a selected range 120 of the coordinate system 105. In such an embodiment, a user may utilize a peripheral device to select any area within the coordinate system 105, using for example the well-known technique of clicking and dragging. As is shown in FIG. 7, the selected area 120 may be rectangular, however in other embodiments it is contemplated that such an input may be any geometric shape or be free form or random in shape. Moreover, the computer 400 and input device 420 may receive a selection of any size area of the coordinate system 105, whether it is as large as the area depicted in FIG. 7 or smaller. In addition, the user input that may be received by the input device 420 may cover any number of distinguishable areas and data points within the coordinate system 105.

Referring now to FIG. 1, a user input may also define a distinguishable area in particular embodiments of the methods and systems disclosed herein. FIG. 1 is an illustration of the image 100 comprising a coordinate system 105 and a plurality of data points 115, without any distinguishable areas. Using the methods and systems disclosed herein, a user may, in particular embodiments, define a plurality of distinguishable areas 110A-110B within the coordinate system 105 using the same or a similar technique as was described above with respect to user input comprising a selected area 120. That is, a user may define distinguishable areas within the coordinate system 105 by clicking and dragging, or equivalent method, on the visual screen, essentially drawing one or more distinguishable areas.

In addition, the user input may comprise a processor 410 receiving an instruction. Such an instruction may be to associate the selected area 120 with a particular one distinguishable area. In another embodiment, such received user input is used by the processor 410, memory 405, and output device 415 to cause modifications to one or more distinguishable areas and the respective formulas.

Visual Generation of Anomaly Detection Image Process

Figure 3:
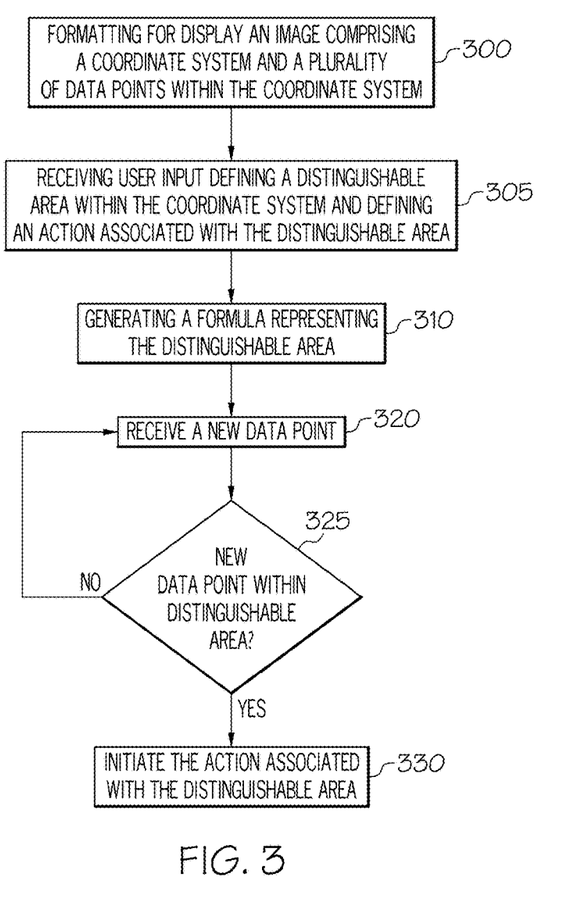
FIG. 3 illustrates a process of visually generating and implementing an anomaly detection image.

Referring now to FIG. 3, the visual generation of an anomaly detection image process is now described. The visual generation of an anomaly detection image process may be used to create an image 100, such as the image in FIG. 2, which may be an anomaly detection image, by defining a plurality of distinguishable areas within the coordinate system 105 of the image 100 illustrated in FIG. 1. The images, including anomaly detection images, created through the visual generation of anomaly detection image process may be used to detect anomalies in APM data or other datasets. Moreover, the images generated through this process may be modified/trained through the visually modifying/training an anomaly detection image process, as described below.

FIG. 3 illustrates the visual generation of anomaly detection image process. Starting with step 300, an image 100 is formatted for display, the image 100 comprising a coordinate system 105 and a plurality of data points 115 within the coordinate system 105. Computer 400 may format the image 100 for display by instructing processor 410 to retrieve the image 100 from a location in memory 405 and send the image 100 to the output device 415 to be displayed on the visual screen. In this step, for example, a user may see on the image 100 appear on the visual screen.

At step 605, input device 420 receives a user input defining a distinguishable area within the coordinate system 105. In certain embodiments, the input device 420 may receive a user input defining a second distinguishable area. As can be seen in FIG. 1, the image 100 may be initially comprised only a coordinate system 105 and a plurality of data points 115. Then, as is reflected in FIG. 2, the user has sent input to the processor 410 to define three distinguishable areas. The first distinguishable area 110A may represent, for example, the anomalous category. The second distinguishable area 110B may represent, for example, the acceptable category. The user may define each of these distinguishable areas by using a peripheral device or sending instructions to the input device 420 and processor 410 to create on the visual map a distinguishable area corresponding to the particular input. As can be seen in FIG. 2, the user input has defined a plurality of rectangular shapes, separating the graph into three distinguishable areas. Although illustrated as rectangular shapes in FIG. 2, the user defined distinguishable areas need not take that form; rather, they may be of varying shapes and sizes and be arranged in any particular manner within the coordinate system 105, depending on the needs of the user and the system, as well as the type of data that he or she may be monitoring.

In certain embodiments of the systems and method disclosed herein, the user input received at step 305 may further include the processor 410 receiving an instruction to associate the distinguishable area with the anomalous category.

In one example, such an instruction may be to associate the defined distinguishable area with the anomalous category. To do so, the input device 420 may pass an instruction to the processor 410 to detect the areas of the coordinate system 105 corresponding to the defined distinguishable area and assign the range of the coordinate system 105 associated with the distinguishable area to the respective formula.

Moreover, the user input received in step 305 also defines an action associated with the distinguishable area. As discussed herein, such action may include, but are not limited to, generating an alert or a notification. Thus, pursuant to the user's received instruction, a distinguishable area may have an action associated with it such that when a data point is observed within that distinguishable area, the action is initiated by the processor 410. Moreover, in certain embodiments, the user input may include receiving a second action to be associated with the second distinguishable area. Therefore, as with the image 100 illustrated in FIG. 2, the processor 410 may initiate a first action when a data point is observed in distinguishable area 110A and my initiate a second action when a data point is observed in distinguishable area 110B.

At step 310, the processor 410 will execute instructions to generate a formula representing the distinguishable area. In embodiments in which there is a second distinguishable area, the processor 410 may execute similar instructions to generate a second formula for the second distinguishable area. There are several methods for generating the formula representing the distinguishable area. In the simplest example, if the user input were in the form of a range of axis values provided to the input device 420, for example by the user typing them into an input field, then generating a formula would merely require compiling the axis values into a formula. In the more difficult scenario, wherein a user may use a peripheral to draw the distinguishable areas on the image 100, there are several image detection techniques available to determine the area of the coordinate system 105 associated with the defined distinguishable area, and generate the formula. Although two of those techniques will be described below, it would be apparent to one skilled in the art that there are several image detection techniques and methods that exist, each of which may be fully capable of detecting the distinguishable area defined by the user and expressing it in terms of formula or a range of the coordinate system 105, such as a set of axis values.

The two image detection techniques discussed herein include utilizing raster and vector images. With the raster image technique, in one embodiment of the present disclosure, the processor 410 may, at step 310, generate a raster image of the coordinate system 105 and the distinguishable area. This may result in a bitmap image of the coordinate system 105 and the distinguishable area, which divides the entire image 100 into a grid of pixels, or bits. Next, if a raster technique were utilized, the processor 410 may detect a plurality of edges of the distinguishable area in the raster image. For example, the processor 410 could search for the bits or pixels of the image that correspond to the color of the distinguishable area, then move out from that point until the processor 410 finds a point that comprised of at least two of the set of colors representing the respective number of distinguishable area. Finding a pixel with at least the colors of two distinguishable areas may indicate an edge of a distinguishable area. That process may be repeated until the processor 410 is satisfied that it has detected all edges of the distinguishable area. Once all edges of the distinguishable area have been identified, the processor 410 may, in this particular example, detect a set of respective axis values corresponding to the distinguishable area. Because the raster image is a grid-like, the processor 410 may detect the axis value corresponding to an edge by, for example, tracing a straight line to each axis of the coordinate system 105 from the edge to detect the location of that edge in terms of the axis values. The processor 410 may then aggregate all of the axis values corresponding to the edges and deliver that dataset to memory 405 in the form of a formula representing the distinguishable area.

A similar but distinct technique for generating formulas at step 310 is utilizing vector images. At step 310 the processor 410 may generate a vector image of the coordinate system 105 and the distinguishable area within the coordinate system 105. A vector image is distinct from a raster in that the vector image is not split up into a grid of pixels, but rather, the components of the image 100 may be separated and described using vectors, i.e., several points and mathematical curves and lines connecting those points. In an embodiment utilizing a vector image technique, several points may be placed along the edge of the distinguishable area. Each point may have a definite position on the axes of the coordinate plane, similar to a data point. The processor 410 would next detect the plurality of points on the vector line defining the distinguishable area, which each have a definite position on the axes of the coordinate system 105. Therefore, in the vector technique, detecting a respective set of axis values corresponding to the plurality of points on the vector line defining the distinguishable area may comprise aggregating all of the vector point data and delivering it to memory 405 in the form of a formula representing the distinguishable area.

Both raster and vector image techniques, as well as other image detection techniques, can be used to detect sets of axis values corresponding to a distinguishable area, a data point, a selected area 120, or any other component of the image 100. Regardless of the technique used, once the axis values of the distinguishable area are detected, they may be compiled into a formula representing the distinguishable area.

Some embodiments of the present disclosure may utilize the anomaly detection image that was generated in steps 300 through 310 to detect anomalies and initiate actions. In such embodiments, at step 320 a new data point is received. At step 325, the processor 410 determines whether the new data point falls within the range of the coordinate system 105 defined by the formula generated at step 310. To make that determination, the processor 410 may, for example, compare the ordered pair (or triplet) of axis values to the range of axis values in the formula. If the data point falls within the range of axis values associated with the formula, the process will at step 330 initiate the action associated with the distinguishable area that graphically represents the formula. In particular embodiments, initiating the action may comprise utilizing the processor 410 to instruct the output device 415 to generate a notification.

Visual Modification/Training of Anomaly Detection Image Process

Figure 8:
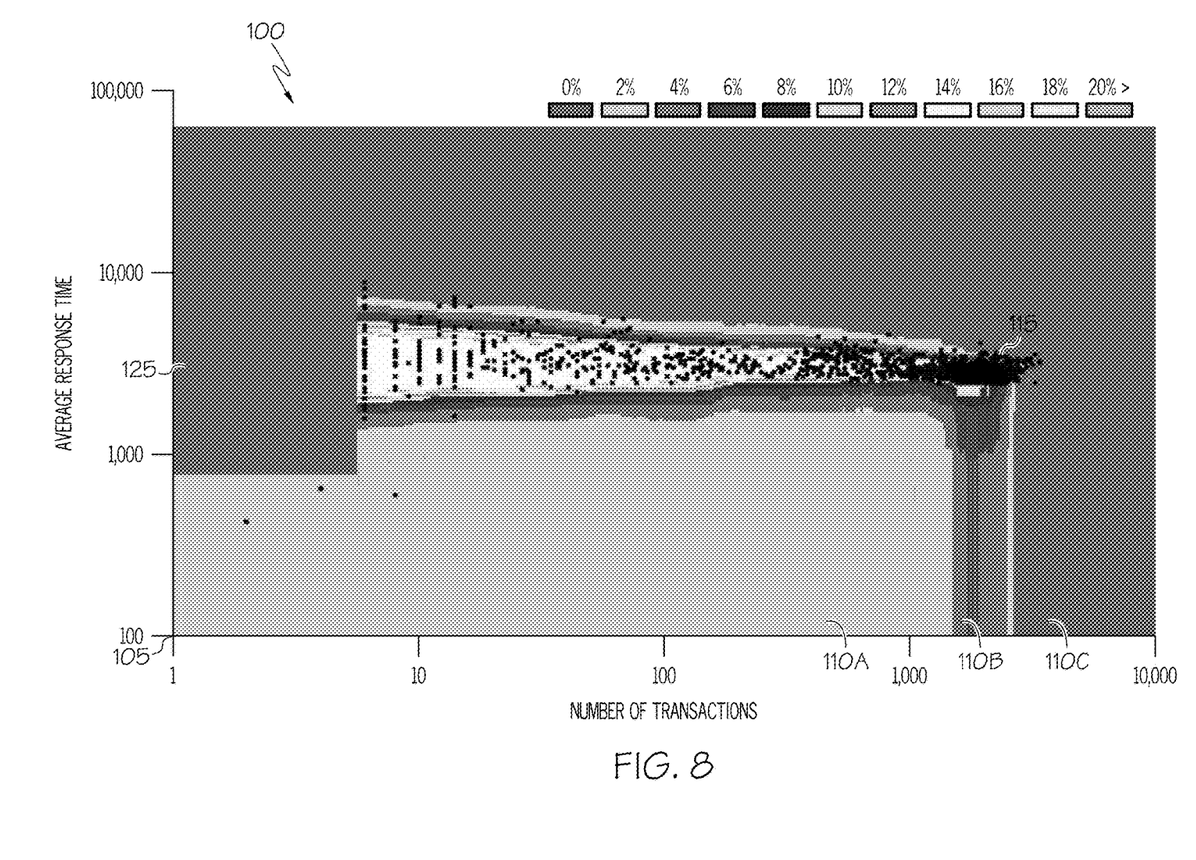
FIG. 8 illustrates an example visualization of a modified representation of the anomaly detection image illustrated in FIG. 5.
Figure 9:
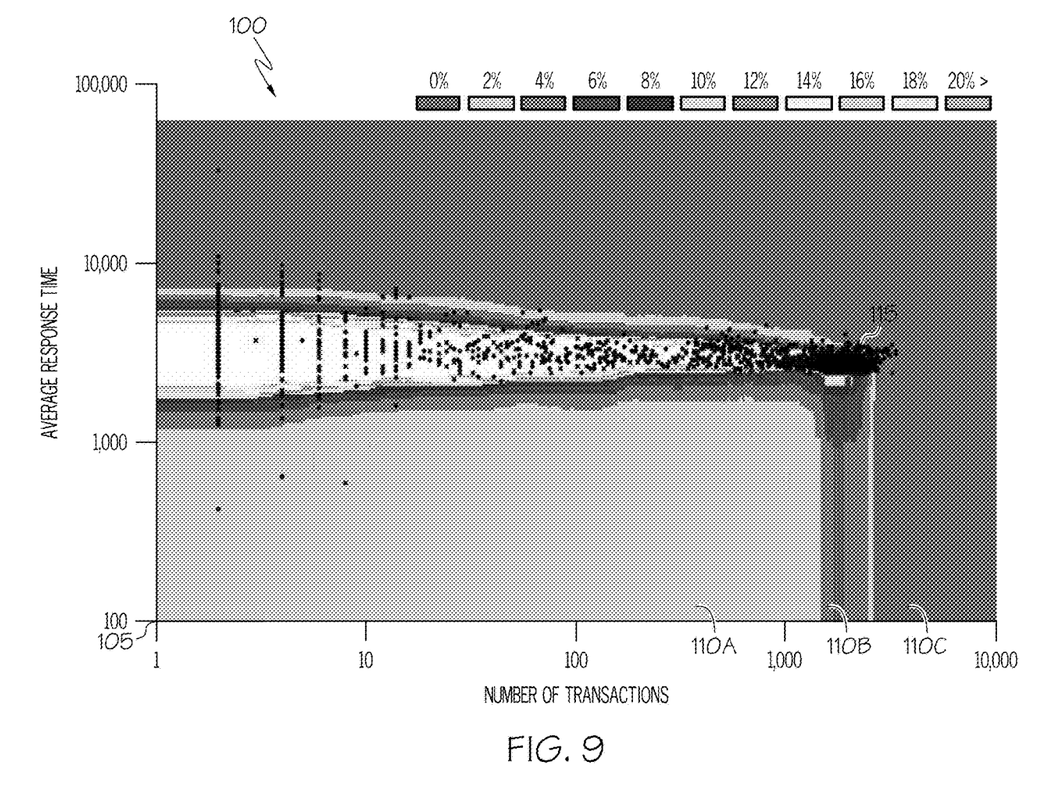
FIG. 9 illustrates a second example visualization of a modified/trained representation of the anomaly detection image illustrated in FIG. 5.

Referring now to FIG. 5, the visual modification/training of anomaly detection image process is now described. The visual modification/training of anomaly detection image process may be used to modify/train an image 100, such as an anomaly detection image generated through the use of the visual generation of anomaly detection image process, as described above. In other embodiments, the modification/training process may be used to modify/train an image 100 that was the output of an previous iteration of the visual modification/training of anomaly detection image process, as can be seen in FIG. 7 and FIG. 8. In other words, in particular embodiments of the systems and methods herein disclosed, the modification/training process may be iteratively performed to modify/train an anomaly detection image in such a way that it accurately captures the human judgment and heuristics of the system operator or other policies. The images which are modified/trained through the visual modification/training of anomaly detection image process may be used to detect anomalies in APM data or other datasets.

Figure 6:
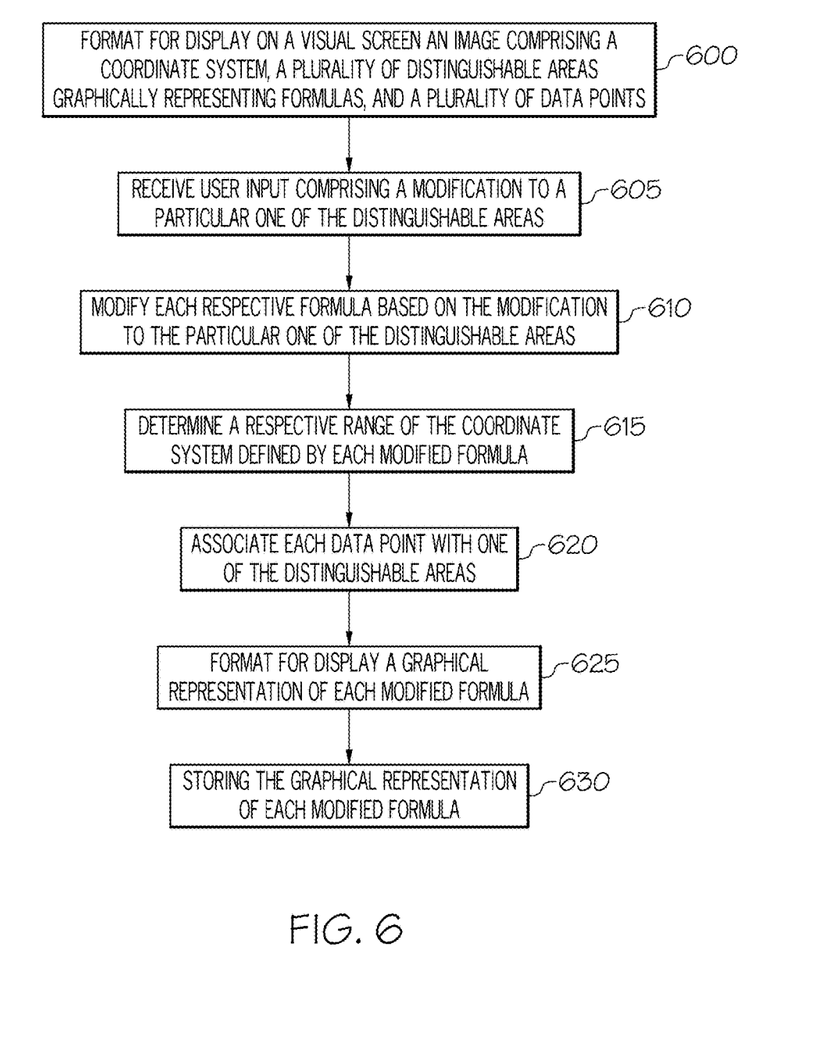
FIG. 6 illustrates the process of visually modifying/training an anomaly detection image.

FIG. 6 illustrates the visual modification/training of anomaly detection image process. Starting with step 600, an image 100 is formatted for display, the image 100 comprising a coordinate system 105, a plurality of distinguishable areas within the coordinate system 105, and a plurality of data points 115 within the coordinate system 105. Computer 400 may format the image 100 for display by instructing processor 410 to retrieve the image 100 from a location in memory 405 and sending the image 100 to the output device 415 to be displayed on the visual screen. In this step, a user may see image 100 displayed on the visual screen, for example, in an APM program.

At step 605, input device 420 receives a user input comprising a modification to a particular one of the plurality of distinguishable areas. In certain embodiments, input device 420 may receive a second user input comprising a second modification to a particular one of the distinguishable areas. In such an embodiment, the second modified distinguishable area may or may not include the first modified distinguishable area. Input device 420 may then send user input to the processor 410, which may carry out any instructions contained in the user input. In some particular embodiments the user input comprises the processor 410 receiving a selected area 120 of the coordinate system 105. In such embodiments, the methods and systems disclosed herein may, for example, detect a range of axis values corresponding to the selected area 120 of the coordinate system 105. There are several techniques for doing so including techniques utilizing raster or bitmap technology to detect the boundaries of the selected area 120, as well as vector image technology which also could be used to detect the area of the coordinate system 105 that corresponds to the selected area 120. Example of such image detection techniques were described above with regard to the visual generation of anomaly detection model process.

In additional particular embodiments, the user input may comprise the processor 410 receiving an instruction to associate the selected area 120 with a distinguishable area. For example, a user may select an area of the coordinate system 105 as illustrated in FIG. 7 and also instruct the computer 400 to associate that selected area 120 with a distinguishable area, such as the distinguishable area corresponding to the anomalous category. Upon receiving such an instruction, the processor 410 would perform the instructed act, for example, by coloring the selected area 120 the same color as the distinguishable area corresponding to the anomalous category, as is illustrated in FIG. 8.

At step 610, and in response to receiving the user input, processor 410 will carry out the instructions necessary to modify one or more respective formulas based on the modification to the distinguishable area. In certain embodiments, processor 410 may carry out instructions necessary to modify one or more respective formulas based on the second modification to a distinguishable area. In particular embodiments, the instructions necessary to modify one or more respective formulas based on the modification may comprise adding or removing a range of the coordinate system 105 from one or more formulas. Such an instruction might be necessary in the scenario where a user selects an area of the image 100 that is associated with the anomalous category and issues an instruction to processor 410 to associate the selected area 120 with the normal category, as can be seen by comparing FIG. 2 to FIG. 9. In such a case, the instructions necessary to modify one or more respective formulas may comprise a first instruction to remove the range of the coordinate system 105 corresponding to the selected area 120 from the formula for the distinguishable area corresponding to the anomalous category, and second instruction to add the range of the coordinate system 105 corresponding to the selected area 120 to the formula for the distinguishable area corresponding to the normal category. In this example, the instructions to modify one or more respective formulas based on the modification to the distinguishable area required modifying only two respective formulas.

In other examples however, many more formulas may need to be modified based on a modification to the distinguishable area. For example, consider the selected area 120 in FIG. 7. That particular example selection covers over five different distinguishable areas. Thus, that selection covers ranges of the coordinate system 105 that are present in at least five different the formulas. Therefore, if the user instructs the processor 410 to associate the selected area 120 with the anomalous category, the result of which is illustrated in FIG. 8, then not only will the range of the coordinate system 105 corresponding to the selected area 120 need to be added to the formula for the distinguishable area corresponding to the anomalous category, but also a respective range or set of axis values of the coordinate system 105 will need to be removed from each of the other formulas that are represented by the other at least five distinguishable areas in the selected area 120. Therefore, in particular embodiments, modifying a distinguishable area may require modifying three, four, five, or more different respective formulas.

At step 620, the computer 400 will, for each data point 205 in the plurality of data points 115, associate the data point with one of the plurality of distinguishable areas by determining which of the modified formulas the data point falls within. One possible method for determining which of the modified formulas the data point falls within is comparing the ordered pair of coordinates of the data point to the rules in the formula for each category until a particular rule or expression in the formula includes the data point. If the formula is comprised of a true set of axis values, then there are various computational searching techniques that could be used such as iterative or graph searching. Each of those techniques have several well-known searching algorithms which would be applicable to the systems and methods disclosed herein.

In one particular embodiment, associating the data point with one of the plurality of distinguishable areas may comprise removing the data point from the image 100. In such an embodiment, once the data point is removed from the image 100, the area of the coordinate system 105 where the data point was formerly located may be filled with the distinguishable area surrounding it, or primarily surrounding it. This may be done for the purpose of producing an image detection model that can be used for new data points in future operations, i.e., without data present in the image. To elaborate, once a user is done selecting areas and modifying distinguishable areas, i.e., when the user is has completed modifying/tuning the image 100, which may in this example be an anomaly detection image, the systems and methods disclosed herein will remove all data points from the image 100 to reveal a graphical representation of the modified formulas, which now have captured human judgment and heuristics into the anomaly detection process by enabling the user to modify complex formulas used for detecting anomalies through a graphical user interface as presented on the visual screen.

Therefore, at step 625, the graphical representation of each modified formula is formatted for display, in a similar fashion as was done in step 600 with the original image 100. In certain embodiments step 625 may include formatting for display on the visual screen an image 100 comprising the coordinate system 105 and the plurality of distinguishable areas within the coordinate system 105 graphically representing the formulas including the modified formulas. At step 630, the graphical representation of each modified formula may be stored for use as a modified image in future operations.

The flowcharts and diagrams in FIGS. 1-9 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

The invention claimed is:

1. A method comprising:
   formatting for display, on a visual screen, an image comprising: (1) a coordinate system, (2) a plurality of distinguishable areas within the coordinate system, each distinguishable area graphically representing a respective formula, and (3) a plurality of data points describing historical performance characteristics of a computing system within the coordinate system, wherein each distinguishable area is colored in the display in a respective color corresponding to an associated tolerance for observing that performance characteristic in the historical performance characteristics;
   receiving a user input comprising a modification to a particular one of the plurality of distinguishable areas, wherein the modification comprises changing an area of the coordinate system covered by the particular one of the distinguishable areas, and changing the respective color to correspond to a different associated tolerance for observing that performance characteristic in data points describing future performance characteristics of the computing system;
   in response to receiving the user input, modifying one or more respective formulas based on the modification to the distinguishable area;
   for each data point in the plurality of data points, associating the data point with one of the plurality of distinguishable areas by determining which of the modified formulas the data point falls within;
   formatting for display a graphical representation of each modified formula;
   storing the graphical representation of each modified formula for use as a modified image in future operations;
   receiving a new data point describing future performance characteristics of the computing system that falls within the area of the coordinate system covered by the particular one of the distinguishable areas and that exceeds the associated tolerance for observing that performance characteristic; and
   generating an alert in response to receiving the new data point.

2. The method of claim 1, wherein each of the plurality of distinguishable areas corresponds to a respective tolerance category, each tolerance category representing an expected frequency of observing a data point.

3. The method of claim 2, wherein the respective tolerance categories include an anomalous category, an acceptable category, and a normal category.

4. The method of claim 1, wherein the coordinate system is three-dimensional.

5. The method of claim 1, wherein associating the data point with one of the plurality of distinguishable areas comprises removing the data point from the image.

6. The method of claim 5, wherein the plurality of data points within the coordinate system comprise a first variable and a second variable, the first variable being a time variable and the second variable being a performance variable.

7. The method of claim 1, wherein the image is the modified image stored during a previous operation.

8. The method of claim 1, further comprising:
receiving a second user input comprising a second modification to a particular one of the plurality of distinguishable areas; and
in response to receiving the second user input, modifying one or more respective formulas based on the second modification to the distinguishable area.

9. The method of claim 1, wherein receiving the user input comprising a modification to a particular one of the plurality of distinguishable areas further comprises:
receiving a selected area of the coordinate system, and
receiving an instruction to associate the selected area with a particular one of the plurality of distinguishable areas.

10. The method of claim 9, further comprising detecting a range of axis values corresponding to the selected area of the coordinate system.

11. The method of claim 1, wherein each respective formula comprises a range of axis values corresponding to the area of the coordinate system associated with a corresponding respective distinguishable area.

12. The method of claim 11, wherein at least one range of axis values is disjointed.

13. The method of claim 11, wherein modifying one or more respective formulas based on the modification to the particular one of the plurality of distinguishable areas comprises removing a range of the coordinate system from a particular formula.

14. The method of claim 11, wherein modifying one or more respective formulas based on the modification to the particular one of the plurality of distinguishable areas comprises adding a range of the coordinate system to a particular formula.

15. The method of claim 1, wherein formatting for display a graphical representation of each modified formula comprises formatting for display, on a visual screen, an image comprising: (1) the coordinate system, and (2) the plurality of distinguishable areas within the coordinate system graphically representing the formulas including the modified one or more formulas.

16. A non-transitory computer readable storage medium storing instructions that are executable to cause a system to perform operations comprising:
formatting for display, on a visual screen, an image comprising: (1) a coordinate system having three dimensions, (2) a plurality of distinguishable areas within the coordinate system, each distinguishable area having three dimensions and graphically representing a respective formula, and (3) a plurality of data points describing historical performance characteristics of a computing system within the coordinate system corresponding to three variables, wherein each distinguishable area is colored in the display in a respective color corresponding to an associated tolerance for observing that performance characteristic in the historical performance characteristics;
receiving a user input comprising a modification to a particular one of the plurality of distinguishable areas, wherein the user input further comprises:
receiving a selected range of the coordinate system,
receiving an instruction to associate the selected range with a particular one of the plurality of distinguishable areas, and
receiving a change to the respective color for the particular one of the distinguishable areas to correspond to a different associated tolerance for observing that performance characteristic in data points describing future performance characteristics of the computing system;
in response to receiving the user input, modifying a plurality of formulas based on the modification to the particular one of the plurality of distinguishable areas;
for each data point in the plurality of data points, associating the data point with one of the plurality of distinguishable areas by determining which of the modified formulas the data point falls within;
formatting for display a graphical representation of each modified formula;
receiving a new data point describing future performance characteristics of the computing system that falls within the area of the coordinate system covered by the particular one of the distinguishable areas and that exceeds the associated tolerance for observing that performance characteristic; and
generating an alert in response to receiving the new data point.

17. The computer readable storage medium of claim 16, wherein formatting for display a graphical representation of each modified formula comprises formatting for display, on a visual screen, an image comprising: (1) the coordinate system, and (2) the plurality of distinguishable areas within the coordinate system graphically representing the modified one or more formulas.

18. The computer readable storage medium of claim 16, wherein each respective formula comprises a range of axis values corresponding to an area of the coordinate system associated with a corresponding respective distinguishable area.

19. The computer readable storage medium of claim 16, wherein each of the plurality of distinguishable areas corresponds to a respective tolerance category, each tolerance category representing an expected frequency of observing a data point.

20. A computer comprising:
a processor; and
a non-transitory computer-readable storage medium storing computer-readable instructions that are executable by the processor to cause the computer to perform:
formatting for display, on a visual screen, an image comprising: (1) a coordinate system, (2) a plurality of distinguishable areas within the coordinate system, each distinguishable area graphically representing a respective formula, and (3) a plurality of data points describing historical performance characteristics of a computing system within the coordinate system, wherein each distinguishable area is colored in the display in a respective color corresponding to an associated tolerance for observing that performance characteristic in the historical performance characteristics;
receiving a user input comprising a modification to a particular one of the plurality of distinguishable areas, wherein the user input further comprises receiving a selected range of the coordinate system, wherein the modification comprises changing an area of the coordinate system covered by the particular one of the distinguishable areas, and changing the respective color to correspond to a different associated tolerance for observing that performance characteristic in data points describing future performance characteristics of the computing system;

in response to receiving the user input, modifying first and second respective formulas based on the modification to the particular one of the plurality of distinguishable areas;

for each of the modified first and second formulas, determining a respective range of the coordinate system defined by the modified formula, wherein determining a respective range of the coordinate system defined by the modified formula comprises detecting a range of axis values corresponding to the area of the coordinate system associated with each respective distinguishable area;

for each data point in the plurality of data points, associating the data point with one of the plurality of distinguishable areas by determining which of the respective ranges of the coordinate system the data point falls within;

formatting for display a graphical representation of the modified first and second formulas;

receiving a new data point describing future performance characteristics of the computing system that falls within the area of the coordinate system covered by the particular one of the distinguishable areas and that exceeds the associated tolerance for observing that performance characteristic; and generating an alert in response to receiving the new data point.

\* \* \* \* \*